United States Patent [19]

Murata et al.

[11] 4,178,354
[45] Dec. 11, 1979

[54] SEQUESTERING AGENT

[75] Inventors: Moriyasu Murata, Chiba; Fumio Sai, Funabashi; Takashi Fujino, Yokohama, all of Japan

[73] Assignee: Kao Soap Co., Ltd, Tokyo, Japan

[21] Appl. No.: 858,794

[22] Filed: Dec. 8, 1977

[30] Foreign Application Priority Data

Dec. 28, 1976 [JP] Japan ............................... 51/157719

[51] Int. Cl.$^2$ .............................................. C01B 25/26
[52] U.S. Cl. ............................................... 423/306
[58] Field of Search ................................ 423/306, 328

[56] References Cited

U.S. PATENT DOCUMENTS

| | | | |
|---|---|---|---|
| 3,355,246 | 11/1967 | Kuehl | 423/329 |
| 3,386,801 | 6/1968 | Kuehl | 423/329 |
| 3,443,892 | 5/1969 | Wacks et al. | 423/306 |

FOREIGN PATENT DOCUMENTS 29579 9/1970 Japan .

OTHER PUBLICATIONS

Zeolite Molecular Sieves by Donald W. Breck, published by John Wiley & Sons, Inc. (1974), pp. 320-344.

Primary Examiner—O. R. Vertiz
Assistant Examiner—Wayne A. Langel
Attorney, Agent, or Firm—Blanchard, Flynn, Thiel, Boutell & Tanis

[57] ABSTRACT

An agent for sequestering heavy-metal ions comprising a water-insoluble amorphous alkali metal aluminosilicophosphate having the formula (I):

$$[x(M_2O).Al_2O_3.y(SiO_2).z(P_2O_5).w(H_2O)] \quad (I)$$

wherein M is alkali metal selected from the group consisting of Na, K and Li, x, y, z and w are integers representing the mole numbers of the respective components, wherein x, y and z satisfy the following relations:
  $0.20 \leq x \leq 1.10$,
  $0.20 \leq y \leq 4.00$, and
  $0.001 \leq z \leq 0.80$, and w is or zero an optional positive number.

6 Claims, 3 Drawing Figures

Sample no. A-4 (the product of the invention)

2θ 10°   20°   30°   40°   50°

FIG. 1 Sample no. A-4 (the product of the invention)
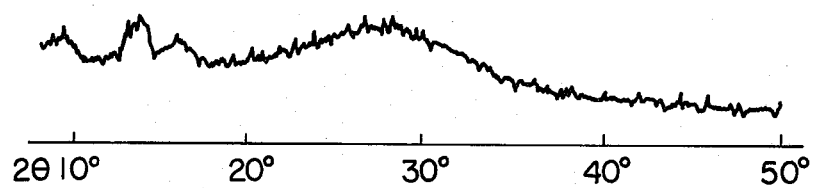
FIG. 2 Sample no. B-1 (comparable example)
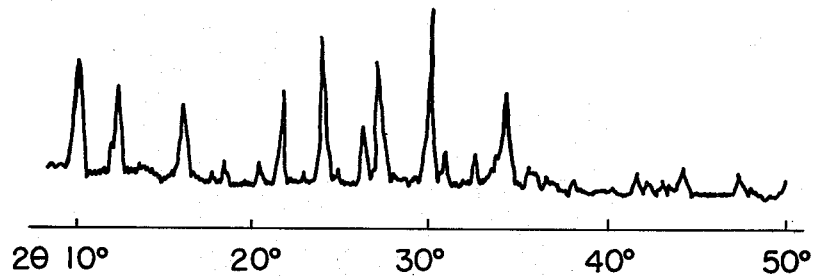
FIG. 3 Sample no. C-3 (comparative example)
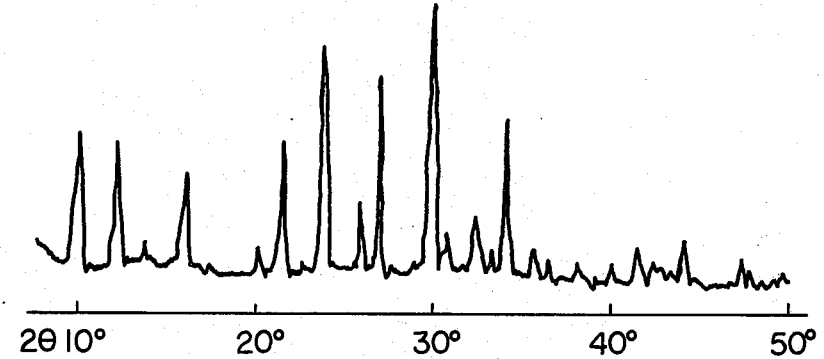

SEQUESTERING AGENT

BACKGROUND OF THE INVENTION

1. Field of the Invention

The present invention relates to a water-insoluble, amorphous, alkali metal aluminosilicophosphate having a large surface area, which can sequester divalent metal ions with high efficiency and can effectively absorb therein gases or solute molecules.

It is a primary object of the present invention to overcome the defect of crystalline aluminosilicates, i.e., zeolites, that are widely used as adsorbents or metal ion sequestering agents in various industries, namely, their lack of a sufficient magnesium ion-sequestering capacity.

More specifically, because zeolites generally have a large surface area, they possess an excellent capacity for adsorbing gas molecules and solute molecules in steam and water and an excellent capacity for sequestering some divalent metal ions, such as calcium, in water, but they are fatally defective for many purposes because the magnesium ion-sequestering capacity thereof is extremely low. The present invention overcomes this defect and provides a metal sequestering agent having a high magnesium ion-sequestering capacity, while maintaining other properties similar to those of conventional zeolites.

2. Description of the Prior Art

Water-soluble, metal ion-sequestering agents exemplified by various phosphates (especially condensed phosphates such as pyrophosphates and tripolyphosphates), aminotricarboxylic acid salts such as ethylenediamine tetraacetates (EDTA) and nitrilotriacetates (NTA), hydroxycarboxylic acid salts such as citric acid salts and gluconic acid salts, and various polymeric electrolytes such as polyacrylic acid salts and alkali-hydrolyzed maleic anhydride-vinyl compound copolymers, are water-soluble and they cannot adsorb solute molecules after sequestering metal ions. In contrast, water-insoluble metal sequestering agents can adsorb solute molecules after sequestering metal ions. Furthermore, water-soluble sequestering agents are defective in the feature that when they are incorporated in a solid (powdery) state into powdery substrates, when the water content of the mixture is increased, the mixture becomes sticky and viscous. In contrast, water-insoluble metal sequestering agents do not have that disadvantage and they possess the capacity of adsorbing gases and solute molecules. Because of these excellent properties of water-insoluble metal sequestering agents, there have heretofore been proposed and used the following water-insoluble metal sequestering agents:

(i) Cation exchange resins (for example, Diaion manufactured by Mitsubishi Kasei and Amberlite IR series manufactured by Rohm & Haas)
(ii) Fibrous polymers
(iii) Clays (for example, montmorillonite $Al_2[Si_4O_{10}(OH)_2].nH_2O$ and beidellite $Al_2[(OH)_2Al.Si_3O_9OH].4H_2O$)
(iv) Crystalline aluminosilicates (for example, Molecular Sieves 3A, 4A and 13X).

Among these water-insoluble metal sequestering agents, crystalline aluminosilicates (zeolites) are cheap and available in large quantities and they can be used on an industrial scale. It is known that among the class of crystalline aluminosilicates, a synthetic crystalline zeolite having the following formula (A) is most preferred:

$$[x_1(M_2O \text{ or } MO).Al_2O_3.y_1(SiO_2).z_1(H_2O)] \quad \text{(A)}$$
(crystalline)

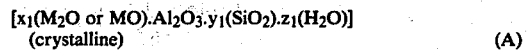

wherein M is an alkali metal or alkaline earth metal, and $x_1$ and $y_1$ are numbers representing the mole numbers of the respective components, and $x_1$ and $y_1$ generally satisfy the following relations:

$0.7 \leq x_1 \leq 1.5$, and
$0.8 \leq y_1 \leq 6$, and $z_1$ is an optional positive number.

Specific examples of synthetic crystalline zeolites of this type include Molecular Sieve 3A $[(Na_2O,K_2O).Al_2O_3.2(SiO_2).4.5(H_2O)]$, Molecular Sieve 4A $[(Na_2O).Al_2O_3.2(SiO_2).4.5(H_2O)]$ and Molecular Sieve 13X $[(Na_2O).Al_2O_3.2.46(SiO_2).6.42(H_2O)]$.

Crystalline aluminosilicophosphates represented by the following general formula (B):

$$[x_2(M_2O).Al_2O_3.y_2(SiO_2).z_2(P_2O_5).w_2(H_2O)] \quad \text{(B)}$$
(crystalline)

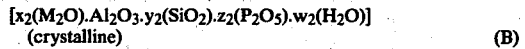

wherein M is sodium or potassium, and $x_2$, $y_2$, $z_2$ and $w_2$ are numbers representing the mole numbers of the respective components, wherein $x_2$, $y_2$ and $z_2$ satisfy the following relations:

$0.5 \leq x_2 \leq 1.1$,
$0.8 \leq y_2 \leq 2.5$, and
$0.01 \leq z_2 \leq 0.80$, and $w_2$ is an optional positive number including zero, are known as adsorbents. Although these crystalline aluminosilicophosphates have not been used as metal sequestering agents, our research has revealed that they have a sequestering activity for divalent metal ions.

A process for the synthesis of crystalline aluminosilicophosphates represented by the general formula (B) is disclosed in Japanese Patent Publication No. 29579/70.

Because crystalline aluminosilicates represented by the above general formula (A) and crystalline aluminosilicophosphates represented by the above general formula (B) have a large surface area owing to crystallographic voids (fine pores of molecular size), they have a high adsorbing capacity and a high metal ion-sequestering capacity, but they have the defect that the magnesium ion-sequestering capacity thereof is low.

BRIEF DESCRIPTION OF THE DRAWINGS

FIG. 1 is an X-ray diffraction pattern of the Sample No. A-4 according to the invention.

FIG. 2 is an X-ray diffraction pattern of the Comparative Sample No. B-1.

FIG. 3 is an X-ray diffraction pattern of the Comparative Sample No. C-3.

SUMMARY OF THE INVENTION

We have discovered that the foregoing defect of the formula A and formula B materials can be eliminated or at least ameliorated by the use of special amorphous alkali metal aluminosilicophosphates. We have now completed the present invention based on this discovery.

More specifically, in accordance with the present invention, there is provided a metal sequestering agent comprising an amorphous alkali metal aluminosilicophosphate having the formula (I).

$$[x(M_2O) \cdot Al_2O_3 \cdot y(SiO_2) \cdot z(P_2O_5) \cdot w(H_2O)] \quad (I)$$
(amorphous)

wherein M is an alkali metal selected from the group consisting of Na, K and Li, x, y, z and w are numbers representing the mole numbers of the respective components, wherein x, y and z satisfy the following relations:

$0.20 \leq x \leq 1.10$,
$0.20 \leq y \leq 4.00$, and
$0.001 \leq z \leq 0.80$, preferably $0.20 \leq z \leq 0.70$,
and w is zero or an optional positive number, preferably from 0–20.

The amorphous alkali metal aluminosilicophosphates of the formula (I) are superior to crystalline aluminosilicates represented by the formula (A) and crystalline aluminosilicophosphates represented by the formula (B) with respect to their magnesium ion-sequestering capacity. Although these amorphous alkali metal aluminosilicophosphates do not possess unit molecular size pores, like those possessed by crystalline aluminosilicates, they have pores having a relatively large pore radius (about 10 to about 200 Å) in a random distribution.

The water-insoluble alkali metal aluminosilicophosphate (formula I) that is used in the present invention must be amorphous. The amorphous alkali metal aluminosilicophosphates are superior to crystalline aluminosilicophosphates with respect to their magnesium ion-sequestering capacity. The reason why this property exists is unknown. The technique of X-ray diffractiometry is most preferred for distinguishing amorphous alkali metal aluminosilicophosphates from crystalline alkali metal aluminosilicophosphates, but they can also and more conveniently be distinguished from one another by measuring their magnesium ion-sequestering capacities according to the method described hereinafter.

It is critical that the amorphous alkali metal aluminosilicophosphate of the formula (I) that is used in the present invention should have a calcium ion-sequestering capacity of at least 180 mg $CaCO_3$/g, preferably at least 200 mg $CaCO_3$/g, especially preferably at least 250 mg $CaCO_3$/g, in water. It also is critical that the amorphous alkali metal aluminosilicophosphate of the present invention (formula I) should have a magnesium ion-sequestering capacity of at least 100 mg, calculated as $CaCO_3$/g, preferably at least 150 mg as $CaCO_3$/g, especially preferably at least 170 mg as $CaCO_3$/g.

The amorphous alkali metal aluminosilicophosphate of the formula (I), that is used in the present invention, preferably has an average specific surface area of at least about 50 m²/g, especially at least 100 m²/g, as measured according to the BET adsorption isotherm. The adsorbing capacity can be reliably estimated from the specific surface area. It is very difficult to express the adsorbing capacity in a generic manner, and therefore, in the present invention, the specific surface area is used as an index indicating the adsorbing capacity.

The amorphous alkali metal aluminosilicophosphate of the formula (I) that is used in the present invention preferably has an average particle size smaller than 100μ, especially smaller than 50μ.

The amorphous alkali metal aluminosilicophosphate of the formula (I) that is used in the present invention need not have a unit pore size of molecular dimension, such as is possessed by crystalline aluminosilicates represented by the formula (A) or crystalline aluminosilicophosphates represented by the formula (B), but the amorphous alkali metal aluminosilicophosphate of formula (I) preferably has pores having an average diameter smaller than 300 Å, especially an average diameter smaller than 150 Å.

The amorphous alkali metal aluminosilicophosphate of the formula (I) that is used in the present invention can be prepared by the process described hereinafter. In the case of aluminosilicates represented by the formula (A), amorphous products are scarcely obtained, but in case of the alkali metal aluminosilicophosphates of the formula (I), amorphous products can easily be obtained. A water-soluble aluminum salt such as aluminum sulfate, aluminum chloride or aluminum nitrate, an alkali metal silicate exemplified by sodium metasilicate, sodium silicate No. 1, sodium silicate No. 2 and sodium silicate No. 3 or silicic acid such as colloidal silica, an alkali metal phosphate exemplified by sodium dihydrogenphosphate, sodium monohydrogenphosphate and trisodium phosphate and an alkaline agent exemplified by sodium hydroxide and potassium hydroxide, are mixed and reacted for a short time (preferably 0.5 to 5 hours) at a relatively low temperature (90° to 100° C.), under atmospheric pressure, thereby to obtain an amorphous alkali metal aluminosilicophosphate having the formula (I).

The amorphous alkali metal aluminosilicophosphate having the formula (I), that is used in the present invention, can be used in combination with a water-insoluble metal ion-sequestering agent represented by the formula (A) or (B) or other compounds, as an adsorbent and/or metal ion-sequestering agent.

The uses of the adsorbent or metal ion-sequestering agent of the present invention will now be described. The agent of the present invention can be effectively used widely in agricultural, chemical, cosmetic, pharmaceutical, food and drink, water treatment, leather, ore dressing, oil and fat, paper manufacturing, photographic, rubber, polymer, plastic, fiber, and the soap and detergent industries, etc.

Recommended applications of the agent of the present invention will now be described.

1. Soil Modifiers

When the agent of the present invention is applied to soil, the cation exchange capacity of the soil is enhanced and the fertilizer component-holding capacity thereof is increased. Further, because the acidity of the soil is moderated, the amount of nutriments that can readily be adsorbed in plants is increased and it is possible to increase the crop yield.

2. Water-Treating Agent

When the agent of the present invention is used for the treatment of industrial waste waters, sewage, radioactive isotope treatment waste waters and waste waters discharged from pig farms and poultry farms, metal ions, ammonium ions and the like can be removed from the wastes with high efficiency.

3. Additive to Soaps and Detergents

When the agent of the present invention is used as an additive to a soap or detergent, it performs various functions as a polyvalent metal ion-sequestering agent, a soil adsorbent, a form-restoring agent, a caking-preventing agent and the like, and it increases the commercial value of the soap or detergent.

4. Bleaching Agent and Additive to Bleaching Agents

A reaction product of the agent of the present invention with hydrogen peroxide can be used as an effective bleaching agent. If the agent of the present invention is added to inorganic peroxides and other bleaching agents, decomposition of peroxides otherwise caused by the presence of minute amounts of polyvalent metal ions can be controlled.

Among the foregoing applications, the applications (3) and (4) are especially recommended. Accordingly, these applications will now be described in more detail.

(1) Soap Additive

A solid soap or solid soap composition, such as a toilet soap bar or synthetic detergent bar, containing the agent of the present invention is free of deformation after use, an appropriate hardness can be maintained and wasteful dissolution is prevented when it is not in use. Further, because the agent of the present invention is water-insoluble, it exhibits a polishing effect to an object being washed and the washing power is enhanced. Still further, formation of scums, otherwise caused by reaction of a soap with polyvalent metal ions in water, is prevented and controlled by incorporation of the agent of the present invention. Still in addition, soils dispersed in the washing liquid are adsorbed in the surface of the agent of the present invention and therefore, the agent of the present invention can also act as an anti-soil redeposition agent.

(2) Builder for Synthetic Detergents for Washing Clothes

Because the agent of the present invention sequesters calcium and magnesium ions very effectively, when it is used as a builder of a synthetic detergent, it sequesters the hardness components in the washing water and exhibits an excellent builder effect of increasing the washing power remarkably. Further, because soils are adsorbed in the surface of the agent, there can be attained an effect of preventing fibers from being recontaminated. A mixture of an active detergent component with the agent of the present invention can be formed into a paste or powder by spray drying, granulation or concentrate mixing.

(3) Additive to Bleaching Agents

Although peroxide-type bleaching agents (oxygen type bleaching agents) such as sodium percarbonate (abbreviated as "PC") and sodium perborate (abbreviated as "PB") are excellent bleaching agents, they are gradually decomposed when stored, for example, in the powdery state, and their activity is lowered. It is considered that the main cause of this deterioration is that polyvalent metal ions are present in minute amounts in the powder and they act as catalysts for decomposing hydrogen peroxide. In a bleaching agent containing the agent of the present invention, because the agent of the present agent sequesters these polyvalent metal ions, decomposition of the effective bleaching ingredients is controlled.

(4) Bleaching Agent

When the agent of the present invention is reacted with hydrogen peroxide under weakly acidic conditions, a water-insoluble bleaching agent having adsorbed hydrogen peroxide can be obtained. This bleaching agent of the present invention is different from sodium percarbonate and sodium perborate in the features that it not only has the bleaching activity, but also it has a polyvalent metal-ion sequestering capacity, a polishing effect and a soil-adsorbing effect.

(5) Base of Hard Surface Cleaner

When the agent of the present invention is used as a base of a cleaner for hard surfaces, such as china, tile and furniture, an excellent cleaning effect can be obtained owing to the special characteristics thereof.

In addition to the above-mentioned uses, the agent of the present invention can be used in various compositions wherein there are utilized its functions as a polyvalent metal ion-sequestering agent, form-restoring agent, hydrogen peroxide adduct or the like.

The present invention will now be described by reference to the following illustrative Preparation and Examples. These Examples do not limit the scope of the invention.

Preparation

The synthesis of the agent of the present invention is first described.

Method (A)

To 75 cc of an aqueous solution of aluminum sulfate having a concentration as indicated below, there was added 50 cc of a mixed aqueous solution of sodium metasilicate and sodium phosphate having concentrations as indicated below, and the mixture was agitated at room temperature in an open vessel. Since gelation of the mixture readily occurred, vigorous agitation had to be carried out. Then, 50 cc of an aqueous solution of sodium hydroxide having a concentration as indicated below was added to the mixture, and the temperature was elevated to 95° C. and reaction was conducted while continuing the agitation throughout. The product obtained when the reaction was conducted for 1 to 3 hours at 95° C. was amorphous sodium aluminosilicophosphate according to the present invention. In contrast, the product obtained when the reaction was conducted for 100 to 200 hours at 95° C. (Sample No. A-6 in Tables 1 and 2) was crystalline sodium aluminosilicophosphate. The crude reaction product was recovered from the reaction system by filtration, washed with deionized water and dried at 105° C. for 5 hours in an electric drier to obtain a substantially anhydrous product. In case of the crystalline product, an anhydride could not be obtained according to this method.

The crystallinity and chemical composition of the product were determined by using an X-ray diffraction apparatus and according to customary chemical analysis. When no sharp peak was observed in the X-ray diffraction profile, the product was judged as being amorphous and when sharp peaks were observed, the product was judged as being crystalline. The water content was variable according to the drying state of the product. Even if the water content was about 80% based on the apparent weight of the product, the powdery state could be maintained. Although the water content of the product was changed in the range of 0 to 80%, if equilibrium was reached under normal conditions, the water content was about 20% of the apparent weight. The water content was calculated from the weight loss at the measurement by a differential thermal analysis apparatus.

Method (B) (Comparative)

Crystalline sodium aluminosilicophosphate as a comparative product could also be obtained according to the method (described below) disclosed in E. M. Flanigen and R. W. Grose, Advances in Chemistry, 101, 76 (1971), (Amer. Chem. Soc.).

To 2.4 g of colloidal silica there were added an aqueous solution of phosphoric acid (5.4 g/20 cc) and a mixed aqueous solution of sodium aluminate and sodium hydroxide (4.1 g of sodium aluminate and 3.0 g of sodium hydroxide/50 cc), and the mixture was agitated at 120° C. for 24 hours in an autoclave. The resulting crystalline product was washed with deionized water and analyzed according to the method described in (A) above.

Method (C) (Comparative)

Amorphous and crystalline sodium aluminosilicates (4A type) as comparative products were obtained according to the following known method. To 50 cc of a mixed aqueous solution containing 10 g of sodium aluminate and 6.8 g of sodium hydroxide there was added an aqueous solution of sodium silicate No. 2 (Na$_2$O.2.5SiO$_2$) (6.8 g/20 cc), and the mixture was agitated at 90° to 100° C. Products were collected when the reaction was conducted for 10 minutes, 20 minutes and 1 hour, respectively, and they were post-treated in the same manner as in the method (A).

As a result of the X-ray diffraction analysis, it was found that the product formed by 10 minutes' reaction was a mixture of about 80% of an amorphous product and about 20% of a crystalline product, the product formed by 20 minutes' reaction was a mixture of about 40% of an amorphous product and about 60% of a crystalline product, and the product obtained by 1 hour's reaction was composed of about 100% of a crystalline product.

The compositions of the reaction mixtures in the method (A) are shown in Table 1, and the chemical compositions and crystal forms of the products obtained by the methods (A), (B) and (C) are shown in Table 2.

Table 1

| | Compositions of Reaction Mixtures in Method (A) | | | |
|---|---|---|---|---|
| Sample No. | Sodium Hydroxide, NaOH (g) | Hydrous Tri-Sodium Phosphate, Na$_3$PO$_4$.12H$_2$O (g) | Hydrous Aluminum Sulfate, Al$_2$(SO$_4$)$_3$.16-18H$_2$O (g) | Hydrous Sodium Metasilicate, Na$_2$O.SiO$_2$.9H$_2$O (g) |
| A-1* | 2.50 | 9.50 | 16.26 | 3.58 |
| A-2* | 2.50 | 9.50 | 16.26 | 6.94 |
| A-3* | 2.50 | 9.50 | 16.26 | 8.50 |
| A-4* | 2.50 | 9.50 | 16.26 | 13.30 |
| A-5* | 2.50 | 9.50 | 16.26 | 28.54 |
| A-6 | 2.50 | 9.50 | 16.26 | 21.10 |

*product of the present invention

Table 2

| | | Products Obtained by Methods (A), (B) and (C) | | | | | |
|---|---|---|---|---|---|---|---|
| Sample No. | Synthesis Method | Chemical Composition | | | | Crystal Form C: crystalline, A: amorphous | Average Specific Surface Area (m$^2$/g) |
| | | x | y | z | w | | |
| A-1* | (A) | 0.33 | 0.37 | 0.026 | 3.25 | A | 100 |
| A-2* | (A) | 0.67 | 0.86 | 0.33 | 2.87 | A | 50 |
| A-3* | (A) | 0.65 | 1.15 | 0.61 | 3.56 | A | 150 |
| A-4* | (A) | 0.90 | 1.60 | 0.20 | 4.00 | A | about 400 |
| A-5* | (A) | 1.03 | 3.12 | 0.007 | 4.92 | A | 380 |
| A-6 | (A) | 0.66 | 2.50 | 0.15 | 4.00 | C | about 800 |
| B-1 | (B) | 1.01 | 1.69 | 0.24 | 2.10 | C | about 750 |
| C-1 | (C) | 1.01 | 1.98 | 0 | 4.58 | C/A = 20/80 | 300 |
| C-2 | (C) | 0.99 | 2.04 | 0 | 4.72 | C/A = 60/40 | 500 |
| C-3 | (C) | 1.02 | 2.00 | 0 | 4.50 | C | about 800 |

*product of the present invention

EXAMPLE 1

In this Example, the calcium ion-sequestering capacity and magnesium ion-sequestering capacity (hereinafter referred to as "Ca$^{2+}$-SC" and "Mg$^{2+}$-SC", respectively) of the agent of the present invention are illustrated.

To an aqueous solution of calcium chloride or magnesium chloride (containing 350 ppm calculated as calcium carbonate, in 200 cc of water) there was added 0.2 g (calculated on an anhydrous basis) of the sample, and the mixture was agitated at 30° C. for 15 minutes while adjusting the pH to 10 by addition of hydrochloric acid or sodium hydroxide. Then, insoluble substances were separated by filtration. The hardness (H$_1$) before addition of the sample and the hardness (H$_2$) of the filtrate were determined by titration using an aqueous solution of sodium ethylenediamine tetraacetate (EDTA). Ca$^{2+}$-SC and Mg$^{2+}$-SC were calculated according to the following formula:

$$Ca^{2+}-SC \text{ or } Mg^{2+}-SC = \frac{H_1 - H_2}{\text{weight of sample in 1 } l}$$

The results obtained are shown in Table 3.

Table 3

| | Calcium Ion-Sequestering Capacity and Magnesium Ion-Sequestering Capacity | |
|---|---|---|
| Sample No. | Ca$^{2+}$-SC (mgCaCO$_3$/g of sample) | Mg$^{2+}$-SC (mgCaCO$_3$/g of sample) |
| A-1* | 200 | 130 |
| A-2* | 280 | 175 |
| A-3* | 267 | 173 |
| A-4* | 288 | 185 |
| A-5* | 274 | 110 |
| A-6 | 240 | 98 |
| B-1 | 251 | 91 |

Table 3-continued

| Sample No. | Calcium Ion-Sequestering Capacity and Magnesium Ion-Sequestering Capacity | |
|---|---|---|
| | $Ca^{2+}$- SC (mgCaCO$_3$/g of sample) | $Mg^{2+}$- SC (mgCaCO$_3$/g of sample) |
| c-1 | 149 | 61 |
| C-2 | 226 | 68 |
| C-3 | 285 | 77 |

*product of the invention.
The weight of the sample was calculated on an anhydrous basis.

EXAMPLE 2

In this Example, it is shown that the agent of the present invention retains an adsorbing capacity in hard water.

Secondary alcohol ethoxylate (Softanol 70 manufactured by Nippon Shokubai) was dissolved in 10° DH hard water containing calcium and magnesium ions [($Ca^{2+}$)/($Mg^{2+}$) molar ratio=3/1], and benzene was added and the mixture was agitated at room temperature for about 5 hours. Then, 0.25 g of the product of the present invention, or comparative product, calculated on an anhydrous basis, was added to 25 cc of the thus-prepared hard water solution containing 1% of the secondary alcohol and 0.1% of solubilized benzene, and the mixture was agitated at room temperature for 10 minutes. The solids were removed by filtration, and the filtrate was collected. The adsorbance at 210-400 m$\mu$ of the solution before addition of the product of the present invention, or the comparative product, and that of the filtrate were determined by an automatic recording spectrophotometer using a 1% hard water solution of the secondary alcohol ethoxylate as a control solution. Strong absorptions were observed at 244 m$\mu$, 249 m$\mu$, 255 m$\mu$ and 261 m$\mu$ in the solution before addition of the product of the present invention, or the comparative product, and it was found that benzene was solubilized in the hard water solution of the secondary alcohol ethoxylate. However, in the filtrates recovered after addition of the products A-1 to A-5 of the present invention and the comparative products A-6, B-1, C-1, C-2 and C-3, the above characteristic absorptions of benzene were not substantially observed. Namely, it was found that organic substances dissolved in hard water, such as benzene, were substantially adsorbed in the samples, and it also was found that the products of the present invention were as excellent as the comparative products in their adsorbing capacity.

EXAMPLE 3

In an aqueous solution of potassium hydroxide (10 g/500 cc) there was dispersed 10 g of the product A-4 of the present invention obtained in the Preparation, and the mixture was agitated for 10 minutes. Solids were collected by filtration and treated in the same manner as described in the Preparation to determine the chemical composition and crystal form. The presence of the potassium atom was detected and it was found that the solids were composed of an amorphous product expressed as 0.90(Na$_2$O, K$_2$O).Al$_2$O$_3$.1.59(SiO$_2$).0.20(P$_2$O$_5$).3.7(H$_2$O) (hereinafter referred to as "A-4K").

The product A-4K and comparative products C-4 and C-5 were tested and evaluated in the same manner as described in Example 1. The results shown in Table 4 were obtained.

Table 4

| Sample No. | Calcium Ion-Sequestering Capacity and Magnesium Ion-Sequestering Capacity | |
|---|---|---|
| | $Ca^{2+}$- SC (mgCaCO$_3$/g of sample) | $Mg^{2+}$- SC (mgCaCO$_3$/g of sample) |
| A-4K* | 285 | 180 |
| C-4 | 242 | 72 |
| C-5 | 227 | 170 |

*product of the present invention
C-4: Molecular Sieve 3A, crystalline (Na$_2$O, K$_2$O). Al$_2$O$_3$ . 2(SiO$_2$) . 4.5(H$_2$O)
C-5: Molecular Sieve 13X, crystalline (Na$_2$O). Al$_2$O$_3$ . 2.4(Sio$_2$) . 6.4(H$_2$O)

The weights of the samples were calculated on an anhydrous basis.

In the same manner as described in Example 2, the adsorbing capacities of these products were evaluated. There was found no substantial difference of the adsorbing capacity among A-4K, C-4 and C-5.

The embodiments of the invention in which an exclusive property or privilege is claimed are defined as follows:

1. Dry particles of a water-insoluble, alkali metal aluminosilicophosphate having the formula (I):

$$x(M_2O).Al_2O_3.y(SiO_2).z(P_2O_5).w(H_2O) \quad \text{(I)}$$
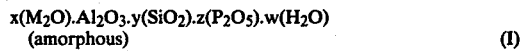
(amorphous)

wherein M is an alkali metal selected from the group consisting of Na, K and Li, x, y, z and w are numbers representing the mole numbers of the respective components wherein x, y and z satisfy the following relations:

$0.20 \leq x \leq 1.10$,
$0.20 \leq y \leq 4.00$, and
$0.001 \leq z \leq 0.80$, and w is zero or an optional positive number, said aluminosilicophosphate being amorphous as determined by X-ray diffraction, said aluminosilicophosphate having a calcium ion-sequestering capacity of at least 180 mg (as CaCO$_3$) per gram of said aluminosilicophosphate and a magnesium ion-sequestering capacity of at least 100 mg (as CaCO$_3$) per gram of said aluminosilicophosphate, said particles having an average particle size smaller than 100$\mu$ and an average specific surface area of at least about 50 m$^2$/g, measured by the BET adsorption isotherm method.

2. Dry particles of an aluminosilicophosphate as set forth in claim 1 wherein z satisfies the following relation:

$0.20 \leq z \leq 0.70$.

3. Dry particles of an aluminosilicophosphate as set forth in claim 2 having a calcium ion-sequestering capacity of at least 200 mg (as CaCO$_3$)/g, a magnesium ion-sequestering capacity of at least 150 mg (as CaCO$_3$)/g, an average specific surface area of at least 100 m$^2$/g measured by the BET method, an average particle size smaller than 50$\mu$ and pores having an average diameter smaller than 150 Angstroms.

4. Dry particles of an aluminosilicophosphate as set forth in claim 3 prepared by mixing and reacting, at 90° to 100° C., for from 0.5 to 5 hours, in aqueous solution, an aluminum salt selected from the group consisting of aluminum sulfate, aluminum chloride and aluminum nitrate, an alkali metal silicate or silica, an alkali metal phosphate and an alkali metal hydroxide to form substantially amorphous aluminosilicophosphate particles, and then recovering, washing and drying the aluminosilicophosphate particles.

5. Dry particles of an aluminosilicophosphate as set forth in claim 1 in which the particles have randomly distributed pores having a pore radius of about 10 to about 200 Angstroms.

6. Dry particles of an aluminosilicophosphate as set forth in claim 1 having X-ray diffraction profile substantially as shown in FIG. 1 of the attached drawing.

* * * * *